(12) United States Patent
Garg et al.

(10) Patent No.: US 11,785,269 B2
(45) Date of Patent: *Oct. 10, 2023

(54) CONTENT ITEM TRANSMISSION

(71) Applicant: Comcast Cable Communications, LLC, Philadelphia, PA (US)

(72) Inventors: Amit Garg, Delran, NJ (US); Jude Ferreira, King of Prussia, PA (US); John Paclik, Cherry Hill, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/854,005

(22) Filed: Apr. 21, 2020

(65) Prior Publication Data
US 2020/0252661 A1 Aug. 6, 2020

Related U.S. Application Data

(63) Continuation of application No. 16/141,297, filed on Sep. 25, 2018, now Pat. No. 10,666,994, which is a continuation of application No. 15/487,880, filed on Apr. 14, 2017, now Pat. No. 10,116,974, which is a continuation of application No. 13/150,337, filed on Jun. 1, 2011, now Pat. No. 9,668,006.

(51) Int. Cl.
*H04N 21/238* (2011.01)
*H04N 21/262* (2011.01)
*H04N 21/2385* (2011.01)

(52) U.S. Cl.
CPC ....... *H04N 21/2385* (2013.01); *H04N 21/262* (2013.01); *H04N 21/26208* (2013.01); *H04N 21/26216* (2013.01); *H05K 999/99* (2013.01)

(58) Field of Classification Search
CPC ............ H04N 21/2385; H04N 21/262; H04N 21/26208; H04N 21/26216
USPC ........................................................ 725/116
See application file for complete search history.

(56) References Cited

U.S. PATENT DOCUMENTS

| | | | |
|---|---|---|---|
| 6,718,552 B1 | 4/2004 | Goode | |
| 7,471,639 B1 | 12/2008 | Bauer et al. | |
| 9,641,900 B2 | 5/2017 | Rahman | |
| 2002/0124262 A1 | 9/2002 | Basso et al. | |
| 2005/0251826 A1* | 11/2005 | Orr | H04N 7/163 |
| | | | 725/46 |
| 2007/0099560 A1 | 5/2007 | Bowen et al. | |
| 2008/0046912 A1 | 2/2008 | Gemelos et al. | |
| 2008/0086741 A1* | 4/2008 | Feldman | H04N 21/6582 |
| | | | 725/13 |
| 2009/0025027 A1 | 1/2009 | Craner | |
| 2009/0077577 A1 | 3/2009 | Allegrezza et al. | |
| 2009/0161752 A1 | 6/2009 | Gong et al. | |
| 2009/0165064 A1 | 6/2009 | Gong et al. | |
| 2009/0193485 A1 | 7/2009 | Rieger et al. | |
| 2009/0207839 A1* | 8/2009 | Cedervall | H04L 67/06 |
| | | | 370/390 |

(Continued)

*Primary Examiner* — Dominic D Saltarelli
(74) *Attorney, Agent, or Firm* — Banner & Witcoff, Ltd.

(57) ABSTRACT

A device, system and method are provided that may allot and manage bandwidth, such as bandwidth associated with broadcast and narrowcast distribution models for content item transmission, for example, in a content distribution network. The device, system and method may manage transmission based on the output information of the content items.

22 Claims, 8 Drawing Sheets

(56) References Cited

U.S. PATENT DOCUMENTS

| | | | |
|---|---|---|---|
| 2010/0070700 A1* | 3/2010 | Borst | G06F 16/24552 711/113 |
| 2011/0072475 A1 | 3/2011 | Mckiel, Jr. | |
| 2011/0083037 A1* | 4/2011 | Bocharov | H04L 65/4069 714/4.11 |
| 2011/0113047 A1* | 5/2011 | Guardalben | G06F 16/9577 707/754 |
| 2011/0320715 A1* | 12/2011 | Ickman | G06Q 30/02 711/118 |
| 2012/0159528 A1 | 6/2012 | Toney, Jr. | |

* cited by examiner

Number of Seconds Selected

| Minute | BRAVO | CNN | ESPN | Total |
|--------|-------|-----|------|-------|
| 00 | 86 | 95 | 10 | 191 |
| 01 | 49 | 91 | 17 | 157 |
| 02 | 51 | 82 | 25 | 158 |
| 03 | 14 | 70 | 88 | 172 |
| 04 | 32 | 21 | 84 | 137 |
| 05 | 71 | 12 | 31 | 114 |
| 06 | 99 | 2 | 30 | 131 |

FIG. 5A

Number of Terminals Selecting

| Minute | BRAVO | CNN | ESPN | Total |
|--------|-------|-----|------|-------|
| 00 | 4 | 10 | 1 | 15 |
| 01 | 7 | 8 | 2 | 17 |
| 02 | 12 | 21 | 14 | 47 |
| 03 | 1 | 20 | 13 | 34 |
| 04 | 3 | 6 | 15 | 24 |
| 05 | 16 | 2 | 3 | 21 |
| 06 | 18 | 1 | 3 | 22 |

FIG. 5B

|           | Time Period 1 | Time Period 2 | Time Period 3 | Time Period 4 | Persistence |
|-----------|---------------|---------------|---------------|---------------|-------------|
| Channel 1 | 1 | 1 | 0 | 0 | 2 |
| Channel 2 | 0 | 0 | 1 | 1 | 2 |
| Channel 3 | 0 | 1 | 0 | 0 | 1 |
| Channel 4 | 0 | 1 | 0 | 0 | 1 |

FIG. 7

CONTENT ITEM TRANSMISSION

CROSS-REFERENCE TO RELATED APPLICATIONS

This application claims priority to and is a continuation of U.S. application Ser. No. 16/141,297, filed Sep. 25, 2018, which is a continuation of U.S. application Ser. No. 15/487,880, filed Apr. 14, 2017, now U.S. Pat. No. 10,116,974, which is a continuation of U.S. application Ser. No. 13/150,337, filed Jun. 1, 2011, now U.S. Pat. No. 9,668,006. The contents of the above applications are hereby incorporated by reference in their entirety.

BACKGROUND

Field of the Disclosure

The disclosure relates to content provisioning, distribution, transmission, and delivery, and, in one aspect, to a device, system and method to allot broadcast and narrowcast for audiovisual communications.

Description of the Background

In a distribution network, numerous discrete, preassigned groups of users, typically referred to as population pools, may interact with content. Each user may receive content that is received by all users, by users of multiple population pools, and may additionally receive, or have available for request, content available for use uniquely by that user, or uniquely by a subset of users, or uniquely by one or certain population pools, at any given time.

Broadcast content, as would be understood to those skilled in the pertinent arts, is content that may be constantly transmitted or otherwise made available to many or all users.

Narrowcast content, such as switched digital video (SDV) and video on demand (VOD) technologies, enables content and network providers to offer a wider variety of content and programming. In a SDV system, for example, unwatched or rarely watched content may be transmitted to particular population pool or pools, and/or to the users, and/or at the times that the content is requested.

Current solutions for assigning or allocating content to broadcast and/or narrowcast distribution models fail to adequately address conditional relationships. More specifically, the selection of a particular content item or channel may be a function of not only conditional relationships with other content items or channels, but also of the overall content or channel lineup of which that particular content item or channel is a part. In other words, for example, that particular content item or channel may be selected more or less frequently dependent upon the presence and content of other content items or channels in the same lineup.

Even with the use of bandwidth management, in order to achieve the highest bandwidth savings it is imperative that a lineup result in the lowest demand on the content distribution system, particularly at peak times. In order to optimize the demand, optimal ranking algorithms are often employed. Such optimal ranking methodologies presently include, for example, ranking based on an overall time of viewing or time of viewing at peak intervals. In these ranking algorithms, the time that a particular content item or channel is selected, or otherwise active, may be rank ordered against all other content items or channels, and a lineup may be chosen by selecting the least popular content items or channels until bandwidth constraints are reached.

SUMMARY OF THE DISCLOSURE

The disclosure relates to a device, system and method to allot, allocate, and manage bandwidth in a network. In some embodiments, the bandwidth may be allocated between a broadcast distribution model and a narrowcast distribution model. The device, system and method may include qualification of content for distribution as broadcast content or narrowcast content. The qualification may occur with regard to selection orthogonality.

The device, system and method may include obtaining source data from at least one of a broadcast server and a narrowcast server. The source data may include usage per time period data, such as binary usage per time period data. The obtained source data may be populated in a plurality of data structures such as fact tables, and the fact tables may be stored in computer storage. In some embodiments, a computer processor may compute or calculate one or more orthogonal groupings in connection with content items or channels based at least in part on the fact tables. The device, system and method may include qualifying or allocating one or more content items or channels between the broadcast server and the narrowcast server in accordance with the computations or calculations.

A correlator, such as a service manager, may make an assessment to execute a qualification. The fact tables may comprise a plurality of vectors indicating, for example, content item or channel dispersion measures. The channel dispersion measures may be made with respect to broadcast or narrowcast content. In some embodiments, the broadcast and narrowcast content may be indicated by one or more channel lineups.

Thus, aspects of the disclosure may provide a device, system and method to allot and manage bandwidth, and qualify broadcast and narrowcast distributions, in a network.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings and in which like reference numerals refer to similar elements.

FIGS. 5A-5B illustrate fact tables in accordance with one or more aspects of the disclosure;

FIG. 7 illustrates a channel dispersion table in accordance with one or more aspects of the disclosure.

DETAILED DESCRIPTION

Various connections between elements are discussed in the following description. These connections are general and, unless specified otherwise, may be direct or indirect, wired or wireless, and this specification is not intended to be limiting in this respect.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

It is to be understood that the figures and descriptions have been simplified to illustrate elements that are relevant for a clear understanding, while eliminating, for the purpose of brevity, many other elements found in typical audiovisual content distribution networks, devices, systems and methodologies. Those of ordinary skill in the art will thus recognize that other elements and/or steps are desirable and/or required in implementing the disclosure. However, because such elements and steps are well known in the art, a discussion of such elements and steps is not provided herein. The disclosure herein is directed to all such variations and modifications of such elements and methods known to those skilled in the art. Furthermore, the embodiments identified and illustrated herein are for exemplary purposes only, and are not meant to be exclusive or limited in their description.

Figure 1:
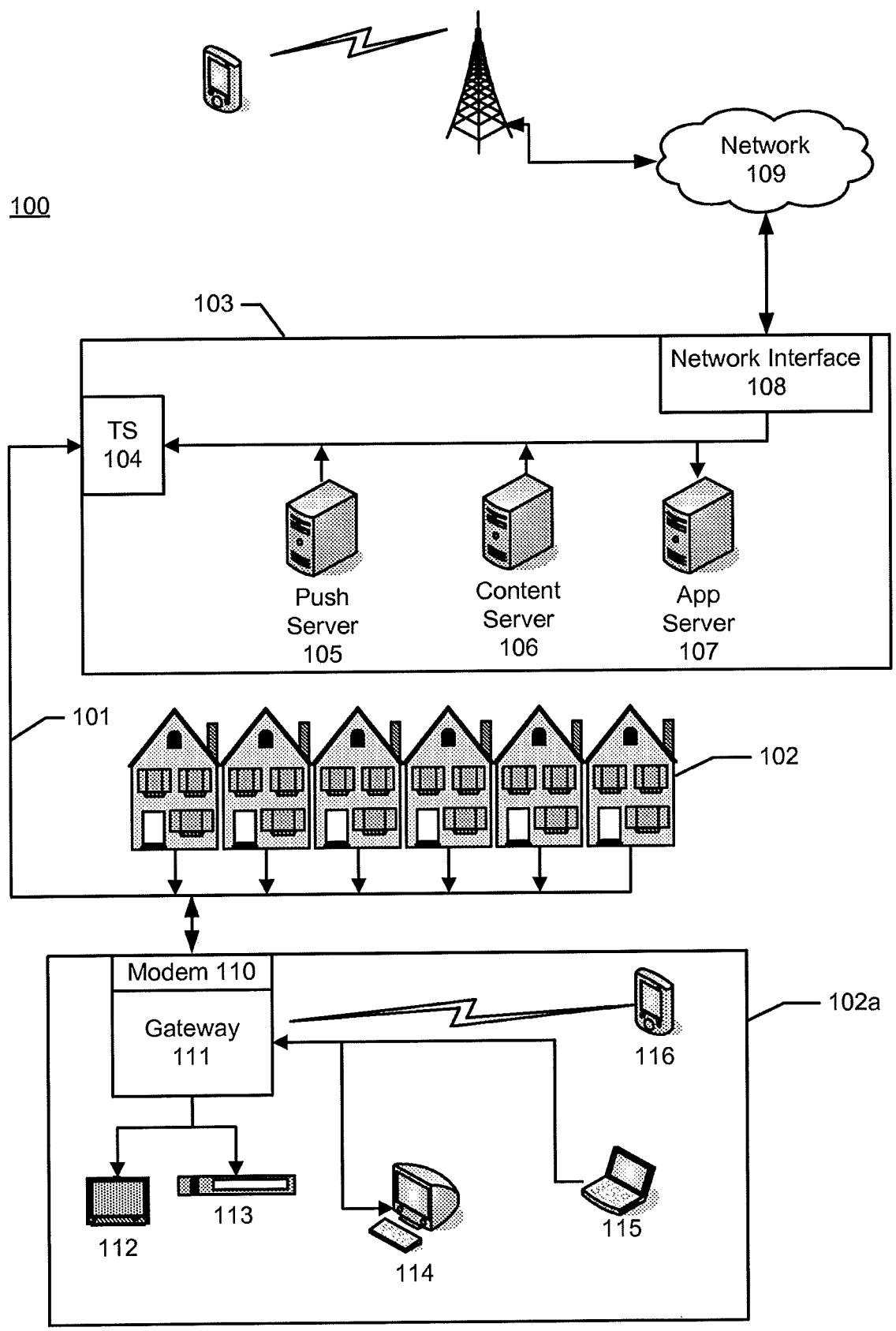
FIG. 1 illustrates an example information distribution network.

FIG. 1 illustrates an example distribution network 100 on which many of the various features described herein may be implemented. Network 100 may be any type of distribution network, such as satellite, telephone, cellular, wireless, etc. One example may be an optical fiber network, a coaxial cable network or a hybrid fiber/coax distribution network. Such networks 100 may use a series of interconnected communication lines 101 (e.g., coaxial cables, optical fibers, wireless, etc.) to connect multiple premises 102 (e.g., businesses, homes, consumer dwellings, etc.) to a central office or headend 103. The central office 103 may transmit downstream information signals onto the lines 101, and each premises 102 may have a receiver used to receive and process those signals.

There may be one line 101 originating from the central office 103, and it may be split a number of times to distribute the signal to various premises 102 in the vicinity (which may be many miles) of the central office 103. The lines 101 may include components not illustrated, such as splitters, filters, amplifiers, etc. to help convey the signal clearly, but in general each split may introduce a bit of signal degradation. Portions of the lines 101 may also be implemented with fiber-optic cable, while other portions may be implemented with coaxial cable, other lines, or wireless communication paths. By running fiber optic cable along some portions, for example, signal degradation in those portions may be significantly minimized, allowing a single central office 103 to reach even farther with its network of lines 101 than before.

The central office 103 may include a termination system (TS) 104, such as a cable modem termination system (CMTS), which may be a computing device configured to manage communications between devices on the network of lines 101 and backend devices such as servers 105-107 (to be discussed further below). The termination system (TS) may be as specified in a standard, such as the Data Over Cable Service Interface Specification (DOCSIS) standard, published by Cable Television Laboratories, Inc. (a.k.a. CableLabs), or it may be a similar or modified device instead. The termination system (TS) may be configured to place data on one or more downstream frequencies to be received by modems at the various premises 102, and to receive upstream communications from those modems on one or more upstream frequencies. The central office 103 may also include one or more network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data and/or commands to the various premises 102 in the network (or more specifically, to the devices in the premises 102 that are configured to detect such notifications). The central office 103 may also include a content server 106. The content server 106 may be one or more computing devices that may be configured to provide content to users in the premises 102. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTMLS, JavaScript, AJAX and COMET). For example, an application server may be responsible for collecting television program listings information and generating a data download for electronic program guide or interactive program guide listings. Another application server may be responsible for monitoring user viewing habits and collecting that information for use in selecting advertisements. Another application server may be responsible for formatting and inserting advertisements in a video stream being transmitted to the premises 102. Another application server may be responsible for receiving user remote control commands, and processing them to provide an intelligent remote control experience.

An example premises 102a may include a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), or any other desired modem device. The modem 110 may be connected to, or be a part of, a gateway interface device 111. The gateway interface device 111 may be a computing device that communicates with the modem 110 to allow one or more other devices in premises 102a to communicate with the central office 103 and other devices beyond the central office. The gateway 111 may be a set-top box (STB), digital video recorder (DVR), computer server, or any other desired computing device. The gateway 111 may also include (not shown) local network interfaces to provide communication signals to devices in the premises 102a, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
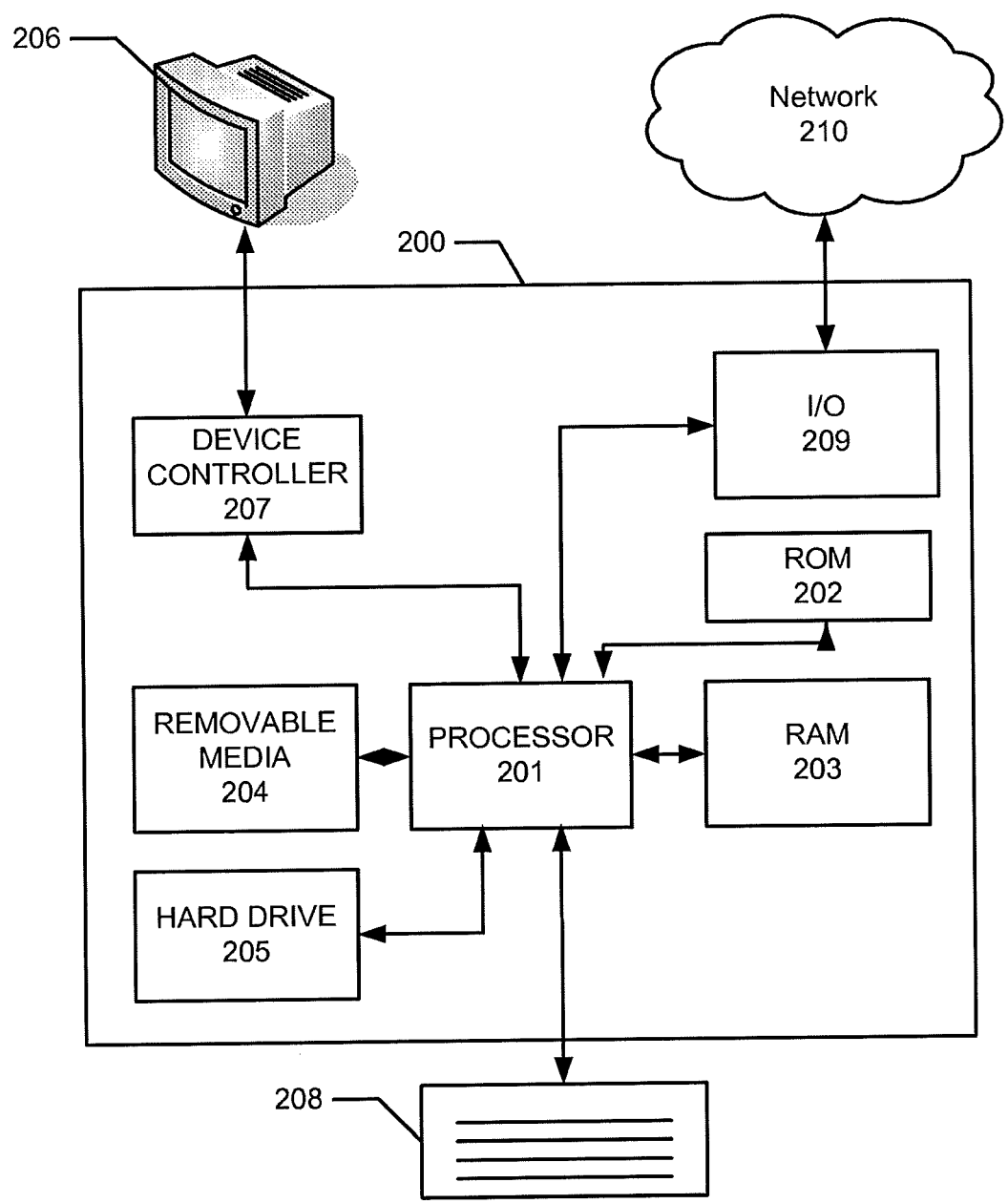
FIG. 2 illustrates an example hardware platform on which the various elements described herein can be implemented.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

Figure 3:
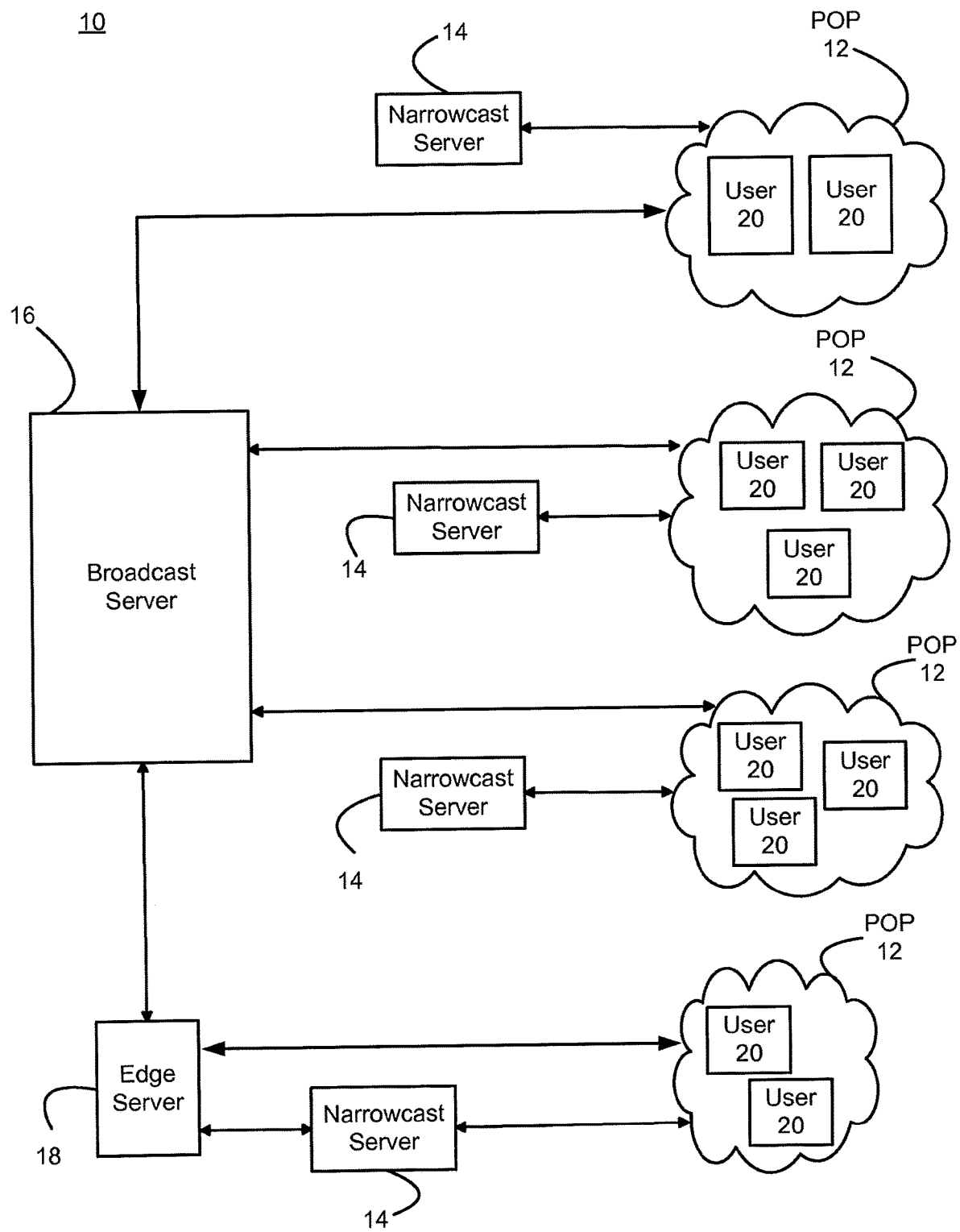
FIG. 3 is a block diagram illustrating a managed content distribution network in accordance with one or more aspects of the disclosure.

FIG. 3 is a block diagram illustrating aspects of a network, such as network 10. In some embodiments, network 10 may include one or more of the devices described above in connection with FIGS. 1-2 and may be configured to distribute content. In some embodiments, network 10 may include a multi system operator (MSO) network. The network 10 may include or serve one or more population pools (POPs) 12. Population pools 12 may be served by, for example, one or several narrowcast servers 14, a broadcast server 16, and at least one edge server 18 corresponding to one or more of population pools 12, wherein each edge server 18 may serve a plurality of users 20. Each user 20 may correspond to, for example, one or more terminals, e.g., a computer, a STB, a mobile device, etc.

In network 10, each user 20 may have access to broadcast content and narrowcast content. A user may access the broadcast content from a single (or limited number of) broadcast server(s) 16 that serves one or more population pools 12, and may access the narrowcast content from the narrowcast server 14 of the population pool 12 to which that user 20 is assigned. In some embodiments, the narrowcast and broadcast content may be available to a user 20 simultaneously. In some embodiments, the user 20 may request the narrowcast content in order to obtain access to that narrowcast content.

In some embodiments, a single broadcast server 16 may service one or more population pools 12. In some embodiments, the group of users and/or terminals forming each population pool 12 may be of a predetermined size, such as 25,000 terminals, for example. In some embodiments, the population pools 12 may be simultaneously served by one or a limited number of narrowcast servers 14, such as a group of 25 to 50 narrowcast servers, for example. Mainstream or popular content may be assigned or qualified to be served by the broadcast server(s) across one or more of the population pools in the network 10, and other, non-mainstream or less popular content may be assigned or qualified to be served by the narrowcast servers across one or more of the population pools.

In some embodiments, a narrowcast server 14 may service specialized or niche content, unicast or similar VOD content, SDV content, and/or other non-mainstream content, pursuant to the qualification of the content as non-mainstream. It follows that, in some embodiments, content not qualified as non-mainstream may be qualified as mainstream content, and thus as broadcast content.

The assignment of content as between broadcast and narrowcast may be based solely on time of viewership of certain content, and, in accordance with aspects of the present disclosure, may instead or additionally be based on the relationship between content and/or channels as compared to other content and/or channels. Thus, in some embodiments the present devices, systems and methods may provide for an assignment of content between broadcast and narrowcast distribution models based on viewership interrelations.

Additionally, in some embodiments interrelationships between content/channels, such as channel dispersion, may be considered, either dynamically or statically, in order to improve bandwidth efficiency. In such embodiments, due to the mutually exclusive, or quasi mutually exclusive, relationships between content items or channels, qualification of particular content items or channels for narrowcast or broadcast in view of the relationship of such content items or channels to other content items or channels may provide for substantially optimized bandwidth usage.

Figure 4:
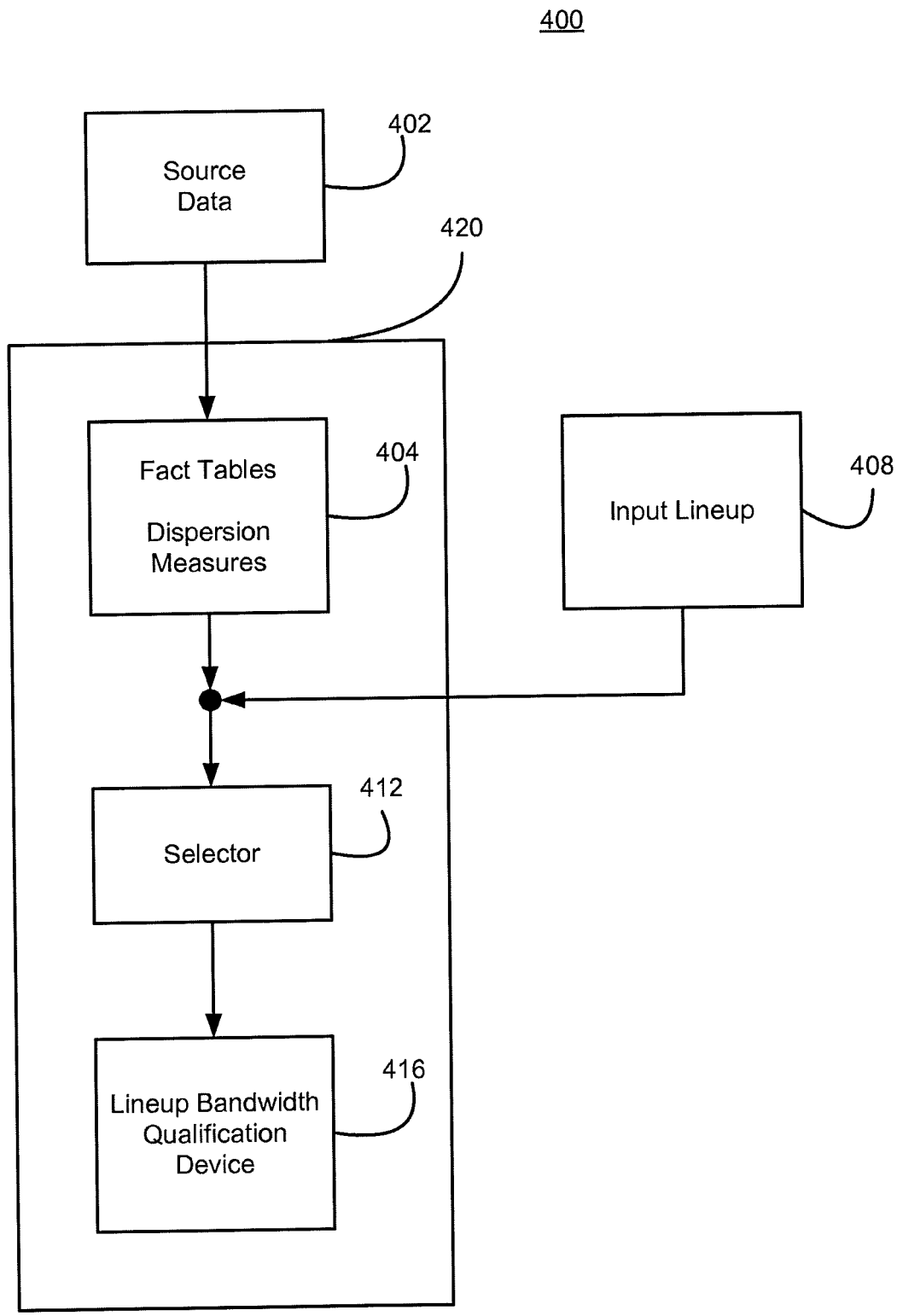
FIG. 4 is a block diagram illustrating a qualification system in accordance with one or more aspects of the disclosure.

FIG. 4 is a block diagram illustrating a qualification system 400 of channels and/or content items based on channel dispersion. As shown in FIG. 4, system 400 may include a computation or calculation device 420. As illustrated, source data 402 may be obtained, such as from the narrowcast servers 14 of FIG. 3, and fact tables 404 may be generated therefrom. Such fact tables 404 may be employed in the decision making processes of a correlator, such as a service manager, for example. Fact tables 404 may be based on, for example, per content item or channel dispersion measures that compare the dispersion of particular content items or channels versus other content items or channels in an input lineup 408 as a measure of time, such as during a particular viewing period or a subset or portion of a viewing period, for example.

In some embodiments, for one or more content items or channels, a vector may be generated to indicate activity during a particular time period. Based at least in part on the generated vector(s), a particular group, or lineup, of content items or channels may be generated reflecting an overall likelihood of activity during a given period. Individual time period probabilities, also referred to herein as dispersions, may allow for the capture of relative selection relationships between content items or channels. Overall demand for a content or channel group may be a function (e.g., a direct function) of the union of all dispersions among the group of content items or channels.

As illustrated in FIG. 4, based on the input lineup 408, the dispersion measure may allow for a selection of particular content items or channels exhibiting a predetermined threshold of orthogonality or other relationship. In some embodiments, a selector 412, which may include the aforementioned correlator/service manager, may select the most used or least used respective content items or channels during a timeframe. Such a timeframe may correspond to a length of a content item (e.g., a program), such as 30 minutes or 1 hour, or another timeframe, such as 1 minute, 2 minutes, 5 minutes, 10 minutes, or 30 minutes, for example. Content items or channels of particular usage levels, such as channels of respectively increased usages, may be qualified for switching, via a lineup bandwidth qualification device 416. For example, narrowcast channels of increased usage may be switched to broadcast. Similarly, broadcast channels of decreased usage may be switched to narrowcast. The lineup bandwidth qualification device 416 may be used to qualify channels or content items in accordance with a broadcast distribution model or a narrowcast distribution model. In some embodiments, the lineup bandwidth qualification device 416 may be associated with or engage in an iterative process, wherein multiple qualifications may be made based on the dispersion measures until an optimal or substantially optimal bandwidth solution is obtained.

FIGS. 5A-5B (collectively referred to as FIG. 5) demonstrate a plurality of illustrative fact tables. As described herein, iterations of FIG. 4 (e.g., lineup bandwidth qualification device 416) may occur based on a variety of available information with regard to usage.

As shown in FIG. 5A, over a given seven minute timespan (reflected via minutes 00-06) the number of seconds per each minute that channels associated with BRAVO, CNN, and ESPN are selected by a group of terminals or other user devices may be computed or tabulated (as reflected via the "Total" column) Thus, as shown in FIG. 5A, in the first minute (minute labeled 00) Bravo may be selected a total of 86 seconds, CNN may be selected a total of 95 seconds, and ESPN may be selected a total of 10 seconds, leading to a total of 191 (86+95+10=191).

In FIG. 5B, a number of terminals selecting, e.g., any channel over a given time period may be calculated or tabulated. For example, as shown in FIG. 5B, in the first minute (minute labeled 00), BRAVO may be selected by 4 terminals, CNN may be selected by 10 terminals, and ESPN may be selected by 1 terminal, leading to a total of 15 terminals (4+10+1=15).

The tabulated/calculated information and data shown in connection with FIG. 5 is illustrative. It is understood that the information and data could be tabulated/calculated based on one or more factors or criteria. For example, a number of unique networks that are selected across a population pool may be calculated or tabulated. Thus, regular or standard definition and high-definition (HD) versions of a given channel may correspond to a unique network in some embodiments. In some embodiments, rather than using channels as shown in FIG. 5, a content item (e.g., a program, an advertisement, an audio track, etc.) may serve as the variable or input that is monitored. Moreover, while shown in one minute resolutions in FIG. 5, any suitable time frame may be used in some embodiments. In some embodiments, the time frame may be stated in terms of a conditional event (e.g., until the start of the next commercial break).

The example of FIG. 4, in view of the illustrative tables of FIG. 5, may allow for an assessment and formulation of orthogonal content item or channel viewing pairs or groups. In some embodiments, the assessed pairs may be used to generate groupings of content items or channels that are most likely, least likely, or likely to within a predetermined level of probability, to be mutually exclusive or quasi mutually exclusive based on use, or based on use at certain times. In some embodiments, pairs or groupings may be made in a variety of ways, such as those ways illustrated in FIG. 5, namely click data, binary on-off data, and the like, for example. Content items or channels may be paired or grouped based at least in part on paired interrelations. Further, data labels such as the fact tables (e.g., the fact tables shown in FIG. 5) may be used to illustrate the impact, either in practice or experimentally, of a typical lineup, pairings made therein, and/or groupings made therein, for example. These illustrations of impact may be used to exploit and allocate bandwidth, for example, in part because, in narrowcast, the most desirable bandwidth data point may be the point at which the most unique content items or channels are selected.

Figure 6:
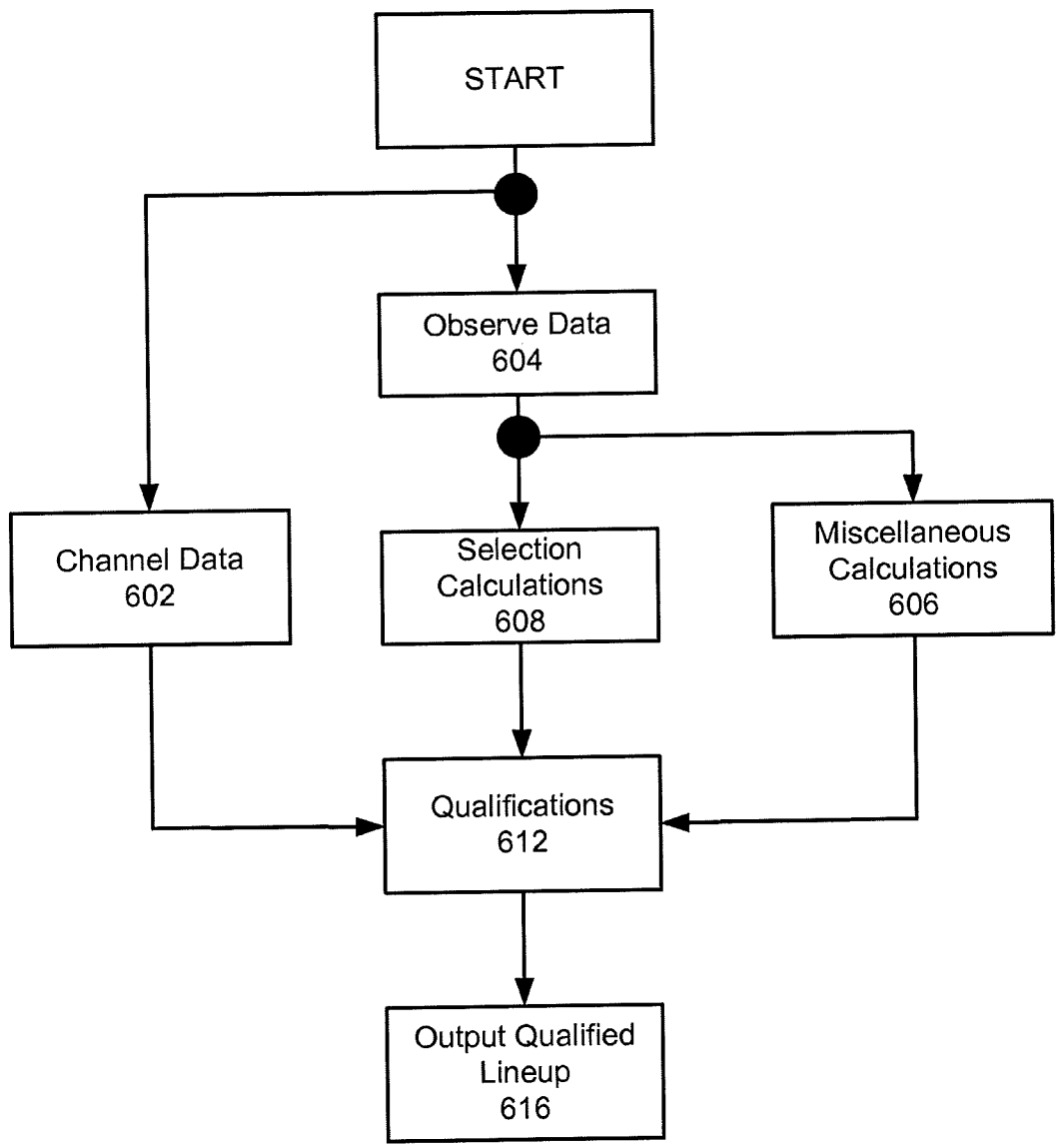
FIG. 6 is a flow diagram illustrating an iterative methodology of channel qualification in accordance with one or more aspects of the disclosure.

FIG. 6 is a flow diagram illustrating an iterative methodology 600 of the qualification described herein. The illustrated flow may make use of channel data at step 602, such as channel lineup data, and may likewise observe data at step 604, such as data generated from terminals or other user devices, for example. Using this data, and in addition accumulating other available data at step 606, such as stream calculations, and viewership or selection data at step 608, such as viewership by time, viewership by network, viewership by channel, and the like, qualification calculations may be performed at step 612 and a qualified lineup (e.g., a lineup qualified as either broadcast and/or narrowcast) may be output at step 616.

In some embodiments, in order to account for an increase in demand for high definition (HD) content, qualification may be based at least in part on dispersion by type, such as HD or standard definition (SD), terminal type, or the like. The methodological acts described herein may be performed with regard to dynamic or static channel or content qualification, and/or actual or experimental channel or content qualification.

In an illustrative embodiment of one or more aspects of this disclosure, channel A and channel B may broadcast certain events, such as football games, at a particular time, such as on Sundays at 1 pm, during the fall. Such football game broadcasts may be part of a broadcast service or distribution model, due at least in part to the fact that football game broadcasts are likely to be among the most watched programs presented at the given time. The football game broadcasts may orthogonally correlate with, for example, broadcasts on the history of China on a historical channel. As such, the content on the historical channel, while typically part of broadcast, may, in accordance with the orthogonal correlation with the football game presentation, be requalified to narrowcast for a certain time, such as for the length of the football games, during the football season, or every Sunday at 1 p.m., by service manager/selector 412. On the other hand, a presentation on the same historical channel with regard to the history of football may more positively correlate with viewership of a football game, and thus, due to the lack of a mutually exclusive or quasi-mutually exclusive relationship, the historical channel may be returned to the broadcast distribution process.

Thus, the devices, systems, and methods disclosed herein may make use of a myriad of readily available viewership information, such as start time, end time, and/or channel watched for one or more terminals or other user devices, per minute viewership for the terminals or other user devices, per minute viewership for one or more population pools, and the like, wherein such information may be broken down by any desired timeframe, such as by 30 minute increments. Therefrom, mutually exclusive or quasi mutually exclusive pairings or groupings may be generated.

FIG. 7 illustrates a binary fact table reflecting selection of four channels during selected time periods in accordance with one or more aspects of this disclosure. As illustrated, channels 1 and 2 may be orthogonal, that is, channels 1 and 2 may be mutually exclusive. In other words, in this example, channel 1 is selected only when channel 2 is not selected. Previous channel selection methodologies not using dispersion methods would suggest, based on the data of FIG. 7, that channels 3 and 4 be switched, that is, be narrowcast, in part due to the relatively low viewership of channels 3 and 4 relative to channels 1 and 2. However, the devices, systems and methods disclosed herein might note that channels 3 and 4 are selected concurrently in this example, thereby implying that no bandwidth gain would occur based on the placement of channels 3 and/or 4 in the narrowcast. Instead, the disclosure may dictate that one of channels 1 and 2 be switched during the orthogonality, because the switching of channel 1 or 2 would result in a 50% bandwidth gain in light of the fact that channels 1 and 2 are not selected concurrently in this example.

While described above in the context of time, it is understood that dispersion could be assessed based on other terms, factors, or inputs. For example, content type may serve as an input or factor in terms of assessing dispersion in some embodiments.

Although not required, various aspects described herein may be embodied as a method, a data processing system, and/or as a transitory and/or non-transitory computer-readable medium storing executable instructions. Accordingly, those aspects may take the form of an entirely hardware embodiment, an entirely software embodiment, an entirely firmware embodiment, or an embodiment combining software, firmware and hardware aspects. The functionality may be resident in a single computing device, or may be distributed across multiple computing devices/platforms, the multiple computing devices/platforms optionally being connected to one another via one or more networks. Moreover, the structural components described herein may be distributed amongst one or more devices, optionally within a common housing or casing.

Various signals representing content, data, or events as described herein may be transferred between a source and a destination in the form of electromagnetic waves traveling through signal-conducting media such as metal wires, optical fibers, and/or wireless transmission media (e.g., air and/or space).

The various methods and acts may be operative across one or more computing servers and one or more networks. The functionality may be distributed in any manner, or may be located in a single computing device (e.g., a server, a client computer, etc.). As discussed herein, content may be distributed to intermediary/network components and client-side devices at various times and in various formats. The distribution and transmission techniques described herein may leverage existing components and infrastructure to minimize power dissipation, operational complexity, footprint size, and management involvement, amongst other factors and costs.

The methodological acts and processes may be tied to particular machines or apparatuses. For example, as described herein, content may distributed to a user location or user premises via one or more computing devices (e.g., servers) and that content may be accessed or displayed at the user location via one or more terminals and/or display devices. The content may be formatted in accordance with one or more transmission techniques, types, or protocols, such as broadcast and narrowcast and reassignment or requalification between the various techniques, types, or protocols may be facilitated based one or more factors or criteria. More generally, one or more computers may include one or more processors and memory storing instructions, that when executed, perform the methodological acts and processes described herein. Furthermore, the methodological acts and processes described herein may perform a variety of functions including transforming an article (e.g., a content or channel lineup) into a different state or thing (e.g., content or channels transmitted in accordance with one or more distribution models based on dispersion calculations).

Those of ordinary skill in the art will recognize that many modifications and variations of this disclosure may be implemented without departing from the spirit or scope of this disclosure. Thus, it is intended that the disclosure cover the modifications and variations, provided they come within the scope of the appended claims and their equivalents.

What is claimed is:

1. A method comprising:
receiving first output information, associated with a first content item, and second output information associated with a second content item;
determining, based on the first output information and on the second output information indicating, together, that the first content item and the second content item are scheduled for overlapping transmission times, that the second content item is not likely to be output when the first content item is being output; and
based on the determining, re-assigning the first content item from a first transmission server to a second transmission server.

2. The method of claim 1, wherein the first transmission server is a broadcast server and the second transmission server is a narrowcast server.

3. The method of claim 1, wherein the first output information indicates one or more user selections of the first content item.

4. The method of claim 1, wherein the first output information indicates one or more user selections of content having a same type as the first content item.

5. The method of claim 1, further comprising:
based on the determining, causing transmission, by the second transmission server, of the second content item.

6. The method of claim 1, wherein the re-assigning causes a reduction in bandwidth usage by the second transmission server.

7. The method of claim 1, wherein the re-assigning increases a number of unique content items transmitted by the second transmission server.

8. The method of claim 1, wherein the first content item is one of a program and a channel.

9. The method of claim 1, wherein the re-assigning is further based on information indicating that a topic of the first content item is different from a topic of the second content item.

10. The method of claim 1, wherein the re-assigning is further based on an audience overlap between:

a first audience associated with the first content item; and
a second audience associated with the second content item.

11. An apparatus comprising:
one or more processors; and
memory storing instructions that, when executed by the one or more processors, cause the apparatus to:
receive first output information, associated with a first content item, and second output information associated with a second content item;
determine, based on the first output information and on the second output information indicating, together, that the first content item and the second content item are scheduled for overlapping transmission times, that the second content item is not likely to be output when the first content item is being output; and
based on the determining, re-assign the first content item from a first transmission server to a second transmission server.

12. The apparatus of claim 11, wherein the first transmission server is a broadcast server and the second transmission server is a narrowcast server.

13. The apparatus of claim 11, wherein the first output information indicates one or more user selections of the first content item.

14. The apparatus of claim 11, wherein the first output information indicates one or more user selections of content having a same type as the first content item.

15. The apparatus of claim 11, wherein the instructions, when executed by the one or more processors, further cause the apparatus to:
based on the determining, cause transmission, by the second transmission server, of the second content item.

16. The apparatus of claim 11, wherein the first content item is one of a program and a channel.

17. Non-transitory computer readable media storing instructions that, when executed by one or more processors, cause:
receiving first output information, associated with a first content item, and second output information associated with a second content item;
determining, based on the first output information and on the second output information indicating, together, that the first content item and the second content item are scheduled for overlapping transmission times, that the second content item is not likely to be output when the first content item is being output; and
based on the determining, re-assigning the first content item from a first transmission server to a second transmission server.

18. The non-transitory computer readable media of claim 17, wherein the first transmission server is a broadcast server and the second transmission server is a narrowcast server.

19. The non-transitory computer readable media of claim 17, wherein the first output information indicates one or more user selections of the first content item.

20. The non-transitory computer readable media of claim 17, wherein the first output information indicates one or more user selections of content having a same type as the first content item.

21. The non-transitory computer readable media of claim 17, wherein the instructions, when executed by the one or more processors, further cause:
based on the determining, causing transmission, by the second transmission server, of the second content item.

22. The non-transitory computer readable media of claim 17, wherein the first content item is one of a program and a channel.

* * * * *

UNITED STATES PATENT AND TRADEMARK OFFICE
CERTIFICATE OF CORRECTION

| | |
|---|---|
| PATENT NO. | : 11,785,269 B2 |
| APPLICATION NO. | : 16/854005 |
| DATED | : October 10, 2023 |
| INVENTOR(S) | : Garg et al. |

It is certified that error appears in the above-identified patent and that said Letters Patent is hereby corrected as shown below:

On the Title Page

Column 2, item (57) Abstract, Line 1:
After "system", insert --,-- therefor

Column 2, item (57) Abstract, Line 5:
After "system", insert --,-- therefor

In the Specification

Column 4, Detailed Description, Line 42:
Delete "HTMLS," and insert --HTML5,-- therefor Column 7, Detailed Description, Line 40:
After "column)", insert --.-- therefor Signed and Sealed this
Twelfth Day of November, 2024

Katherine Kelly Vidal
*Director of the United States Patent and Trademark Office*